United States Patent [19]
Dalton

[11] Patent Number: 5,667,449
[45] Date of Patent: Sep. 16, 1997

[54] FLUID-CONTROLLED BICYCLE TRANSMISSION

[76] Inventor: Curtis E. Dalton, 3A Fletcher Way, Salem, Mass. 01970

[21] Appl. No.: 527,789

[22] Filed: Sep. 13, 1995

[51] Int. Cl.[6] .................................................. F16H 59/00
[52] U.S. Cl. ......................... 474/28; 474/29; 474/70
[58] Field of Search ......................... 474/28, 29, 46, 474/70, 104, 110

[56] References Cited

U.S. PATENT DOCUMENTS

| 589,266 | 8/1897 | Nedland et al. |
|---|---|---|
| 803,554 | 11/1905 | Case. |
| 2,378,634 | 6/1945 | Hussey. |
| 2,956,443 | 10/1960 | Nelson ............................. 474/70 X |
| 4,201,094 | 5/1980 | Rathmell ............................. 474/70 |
| 4,889,354 | 12/1989 | Wen ............................. 474/50 X |
| 4,955,247 | 9/1990 | Marshall ............................. 74/347 |
| 5,228,354 | 7/1993 | Oosterwal et al. ............................. 74/347 |
| 5,251,504 | 10/1993 | Summerville, Jr. et al. ............................. 74/368 |
| 5,342,075 | 8/1994 | Williams ............................. 74/347 X |

FOREIGN PATENT DOCUMENTS 18621 of 1888 United Kingdom.
3172 of 1890 United Kingdom.

Primary Examiner—Roger J. Schoeppel
Attorney, Agent, or Firm—Bookstein & Kudirka, P.C.

[57] ABSTRACT

A multi-speed transmission is provided which employs inflatable diaphragms to alter drive ratio. Particularly applicable to bicycles, the transmission is composed of a diaphragm mounted at the pedal axis and another mounted at the drive wheel axis, with a nylon drive belt connecting the two. These diaphragms are each inflated and deflated by way of pressurized cylinders mounted on the bicycle. Pedaling of the bicycle turns the pedal axis diaphragm which, in turn, drives the rear wheel diaphragm via a nylon drive belt. Pressure tubes carry the pressurized fluids from each of the cylinders to their respective diaphragm. Standard shifter mechanisms are used each of which, when moved, moves a piston within one of the cylinders, changing the pressure in that cylinder and the inflation of its respective diaphragm.

9 Claims, 7 Drawing Sheets

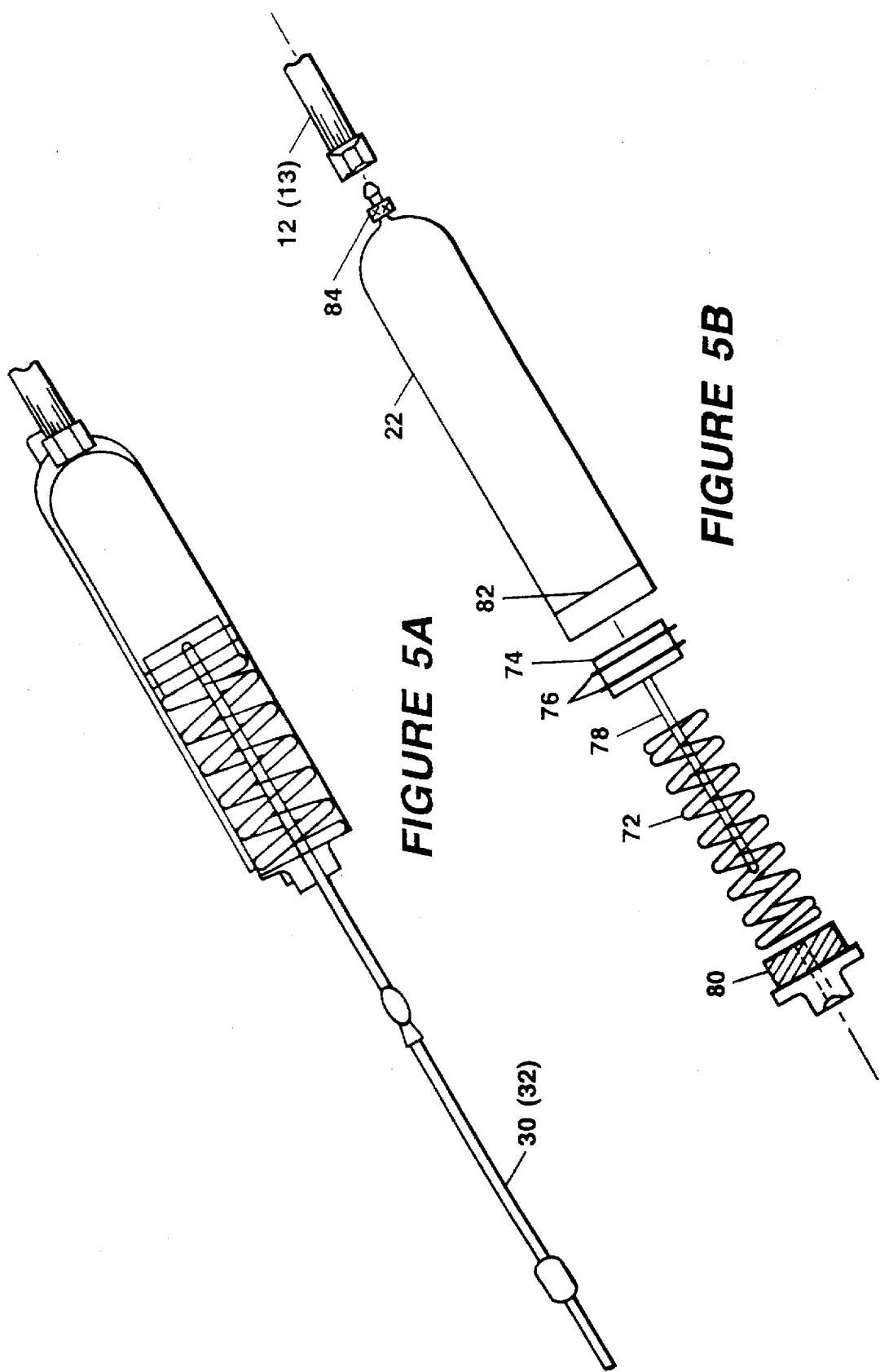

FLUID-CONTROLLED BICYCLE TRANSMISSION

BACKGROUND OF THE INVENTION

1. Field of the Invention

This invention relates to power transmissions and, specifically, to transmissions for bicycles.

2. Description of the Related Art

U.S. Pat. No. 589,266 to B. T. Nedland & C. Fredrickson describes a drive plate gear having separate gearing tracks. These gearing tracks were selectively engaged via drive shaft-attached pinion gears to change speed. In 1905, M. Jean-Baptiste Maynie of France patented a drive plate gear changing mechanism which incorporated six concentric gearing tracks engaged by a single drive shaft-attached pinion gear for ratio alterations. Variations on this shaft driven example were developed in 1945 by C. L. Hussey, and later by Marshall in 1990 who substituted the drive shaft with a chain drive but retained a gear change mechanism similar to those found in earlier accomplishments. These prior art models, however, proved to be costly to manufacture and provided for a relatively small number of gear ratios.

In U.S. Pat. No. 5,228,354 to Oosterwal et al teaches a gear change mechanism which utilizes both front and rear drive plate gears selectively engaged via axially movable pinion gears positioned at both the front and the rear of the drive shaft respectively adjacent their drive plate gear. A similar duality of drive plate gears is described by U.S. Pat. No. 5,342,075 to Williams. The invention of Williams, however, requires the cyclist to momentarily stop pedaling to change gear ratios.

The chain driven multi-speed derailleur system has proven itself over the years as lightweight, inexpensive to manufacture, and efficient. It also provides a wide range of gearing ratios selected via compact shifter devices and cables. The derailleur system does, however, have its disadvantages. One of the chief disadvantages of the derailleur system is its propensity to jam the chain between two sprockets while shifting. A second disadvantage of the derailleur system is its propensity to inappropriately shift by itself when used on rough terrain. Given the already large and ever increasing market of off-road bicycles (i.e., hybrids, Mountain bicycles) these difficulties have become more pronounced.

It is an object of this invention to provide a replacement for the popular derailleur chain drive system which is lightweight, quiet, efficient on all terrain and easily retrofit to existing bicycle designs.

SUMMARY OF THE INVENTION

The invention is embodied in two diaphragms which are inflated and deflated by pressurized fluids delivered along small diameter tubes from pressure cylinders. The diaphragms, one mounted at the pedal axis and the other mounted at the drive wheel hub, are connected to each other by a drive belt. The invention is particularly applicable to bicycles so herein lies the focus.

The mechanism employs a shift-selected combination of ratios derived from the increasing and decreasing diametric size of the diaphragms. Power is transferred from the pedal hub to the drive wheel via rotation of the diaphragm mounted at the pedal axis. The rotation of this diaphragm drives a second diaphragm mounted at the drive wheel hub via the drive belt.

Altering the drive ratio involves either increasing or decreasing the fluid pressure within the diaphragms. As the pressure is increased within a diaphragm its diametric size also increases. Inversely, as the pressure is decreased within a diaphragm its diametric size also decreases. This alteration of the diametric size of each of the two diaphragms in relation to one another changes the drive ratio.

Fluid pressure within the diaphragms is controlled by pressure cylinders. In the preferred embodiment the fluid is air, but other gases or liquids may also be used. Pistons within the cylinders are mechanically moved to pressurize and de-pressurize the fluid within the cylinder chambers. The cylinder chambers are each in fluid communication with one of the diaphragms and thus, pressurizing and depressurizing the cylinders correspondingly results in pressurizing and de-pressurizing the respective diaphragms. Shifter mechanisms are used to draw and release shifter cables, each of which is connected to the piston of one of the cylinders. With one shifter, the fluid pressure within the pedal axis pressure cylinder is either increased or decreased thereby increasing or decreasing the diametric size of the pedal axis diaphragm. With a second shifter, the fluid pressure within the drive wheel hub pressure cylinder is either increased or decreased, thereby increasing or decreasing the diametric size of the drive wheel diaphragm.

Smooth ratio transition is achieved via constant contact between the drive belt and the diaphragms whose diametric size alterations cover a continuous range of sizes. By altering the diameter ratio between the two diaphragms by adjusting one or both of the shifters, the gear ratio may be set as desired. Furthermore, the diaphragms may be provided with a minimum pressure (i.e. the pressure when the corresponding shifter is at the lowest point in its range) relative to each other which establishes an initial gear ratio between the two diaphragms. Since the available range of gear ratios is relative to this initial gear ratio, the transmission may thereby be customized to a particular rider who might want the range of available gear ratios to span a higher or lower set of ratios.

The process of retrofitting the present invention to existing bicycles is relatively straightforward. All existing rear sprockets, front sprockets, chain and derailleur mechanisms are removed. The existing rear coast mechanism is utilized and remains on the bicycle. The pedal axis diaphragm assembly is mounted on the pedal axis and the drive belt attached drive wheel diaphragm assembly and drive belt tensioner assembly is mounted at the drive wheel axis. The pressure cylinders are next mounted to the cycle frame. Pressure tubes are then used to connect the pressure cylinders with the diaphragms and the shifter cables are attached to the pressure cylinder piston arms.

BRIEF DESCRIPTION OF THE DRAWINGS

FIG. 5A is a side assembled view of the pressure cylinder assembly.

FIG. 5B is a side exploded view of the pressure cylinder assembly.

DETAILED DESCRIPTION OF THE PREFERRED EMBODIMENT

Figure 1:
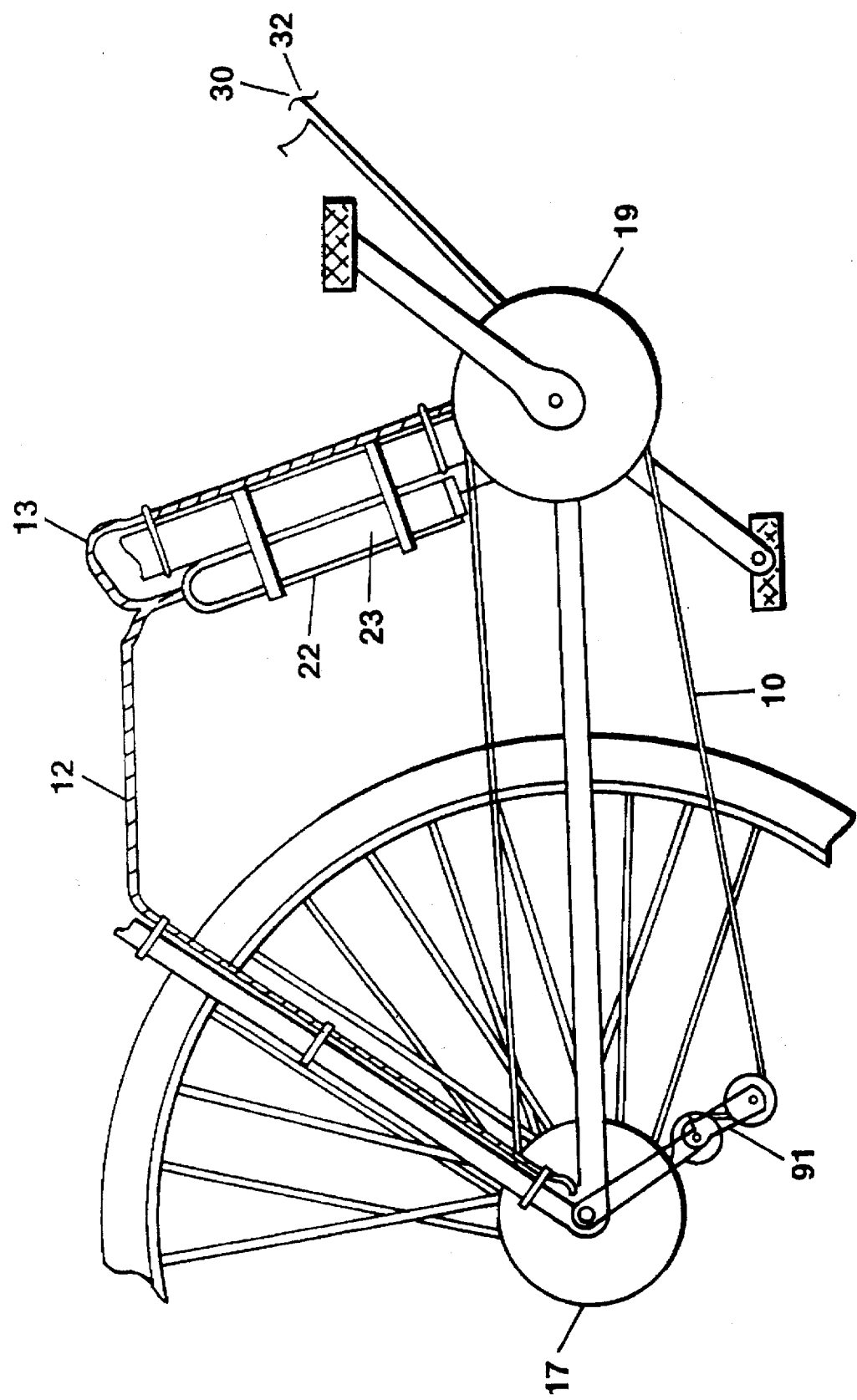
FIG. 1 is a side elevation of a bicycle equipped with a transmission according to the invention.

Referring to FIG. 1 it may be seen that components of the invention are mounted at the pedal axis, the drive wheel hub, and the center frame of the bicycle. The pedal axis diaphragm assembly 19, in operation, drives the drive belt 10 and thereby rotates the drive wheel diaphragm assembly 17. Drive ratios are altered via either or both of shifter cables 30, 32 which, respectively, draw or release pressure into or out of the pressure cylinders 22, 23 along pressure tubes 12, 13 to the pedal axis diaphragm assembly 19 and the drive wheel diaphragm assembly 17.

Figure 2:
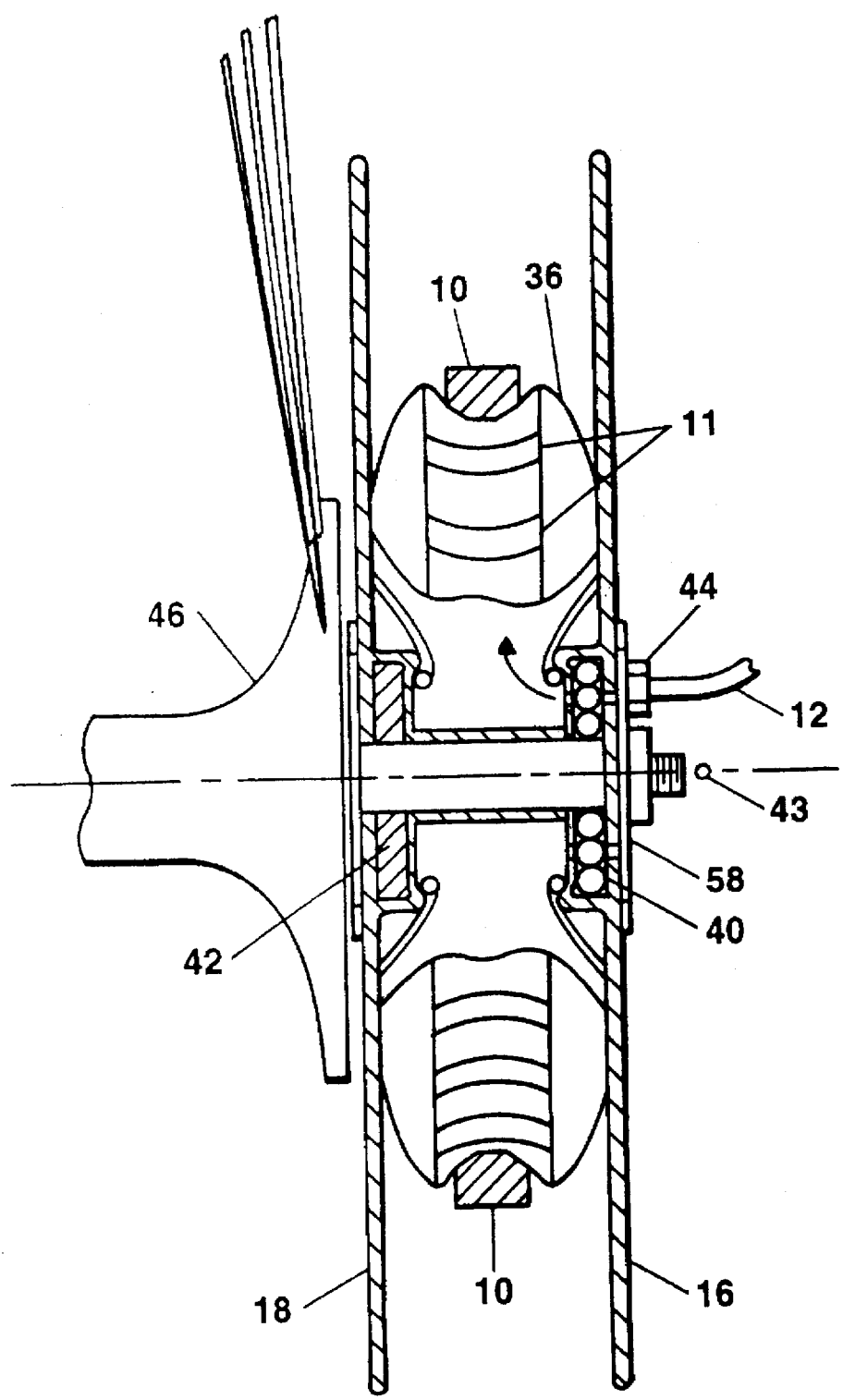
FIG. 2 is a rear cut away view of the drive wheel diaphragm assembly of the transmission mounted at the drive wheel hub.
Figure 6:
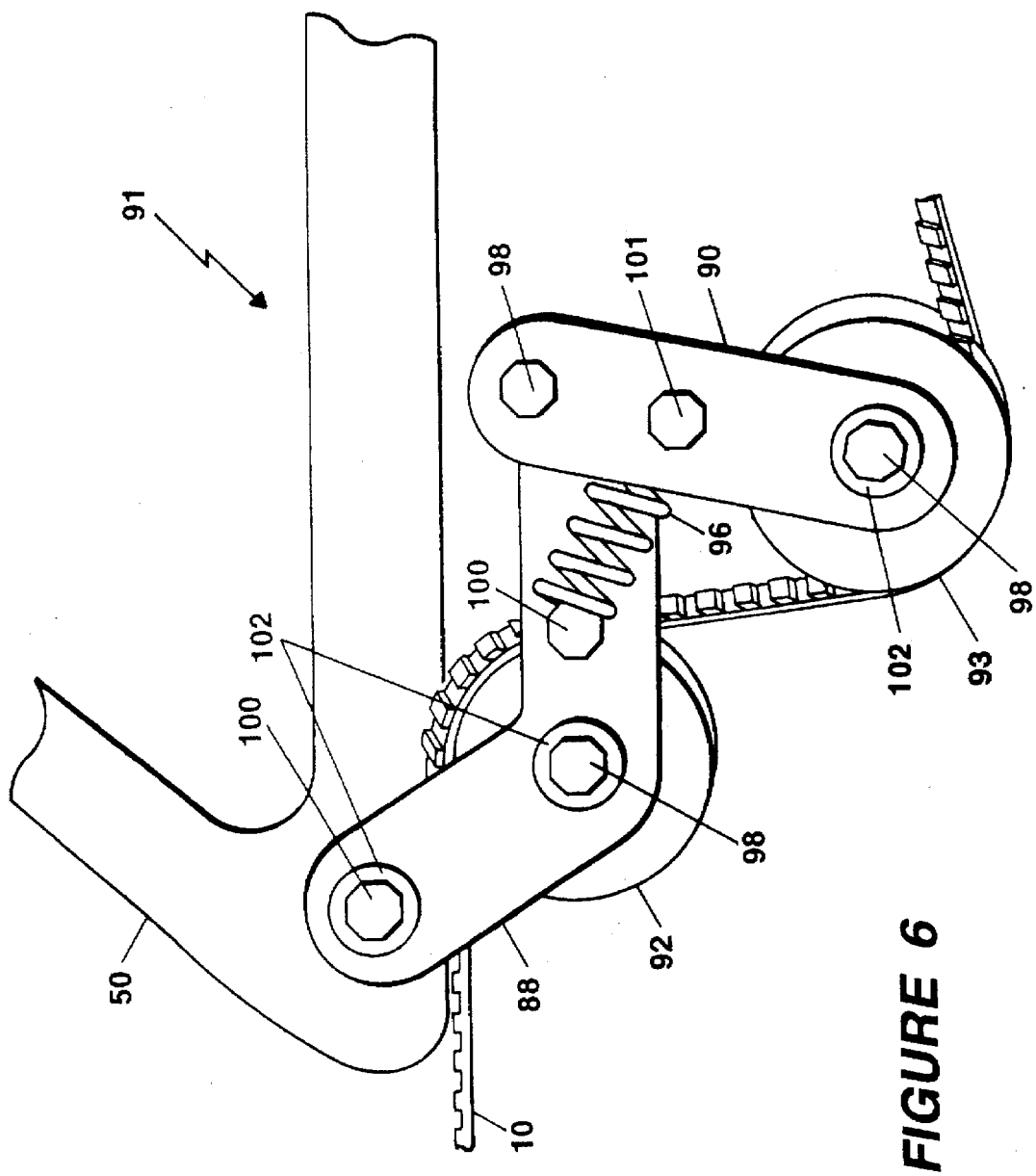
FIG. 6 is a side view of the drive belt tensioner assembly mounted at the drive wheel axis.

Depicted in FIG. 2 is the drive wheel diaphragm assembly 17. Outer support wall 16 and inner support wall 18 are mounted on either side of diaphragm 36 to the right of the drive wheel hub 46 (from the perspective of standing behind the bicycle). The diaphragm 36 is somewhat toroidally-shaped, and encircles a portion of the drive wheel axis, being sealed to an inner surface of each of the inner support wall 18 and the outer support wall 16. Inner support wall 18 is seated on the rear axle, and has a circular recess into which fits inner seat 42. Outer support wall 16 is also seated on the rear axle, and has a circular recess into which fits large ball bearing seat 40. Pressure changes are relayed to the drive wheel diaphragm 36 via pressure tube 12, which is secured to the rotationally-independent pressure cuff 58 via the pressure tube hex nut 44. Drive belt 10 rides along the outer circumference of the drive wheel diaphragm 36 where friction is maintained via raised teeth 11 which grip raised teeth on the drive belt 10 (FIG. 6).

Figure 3:
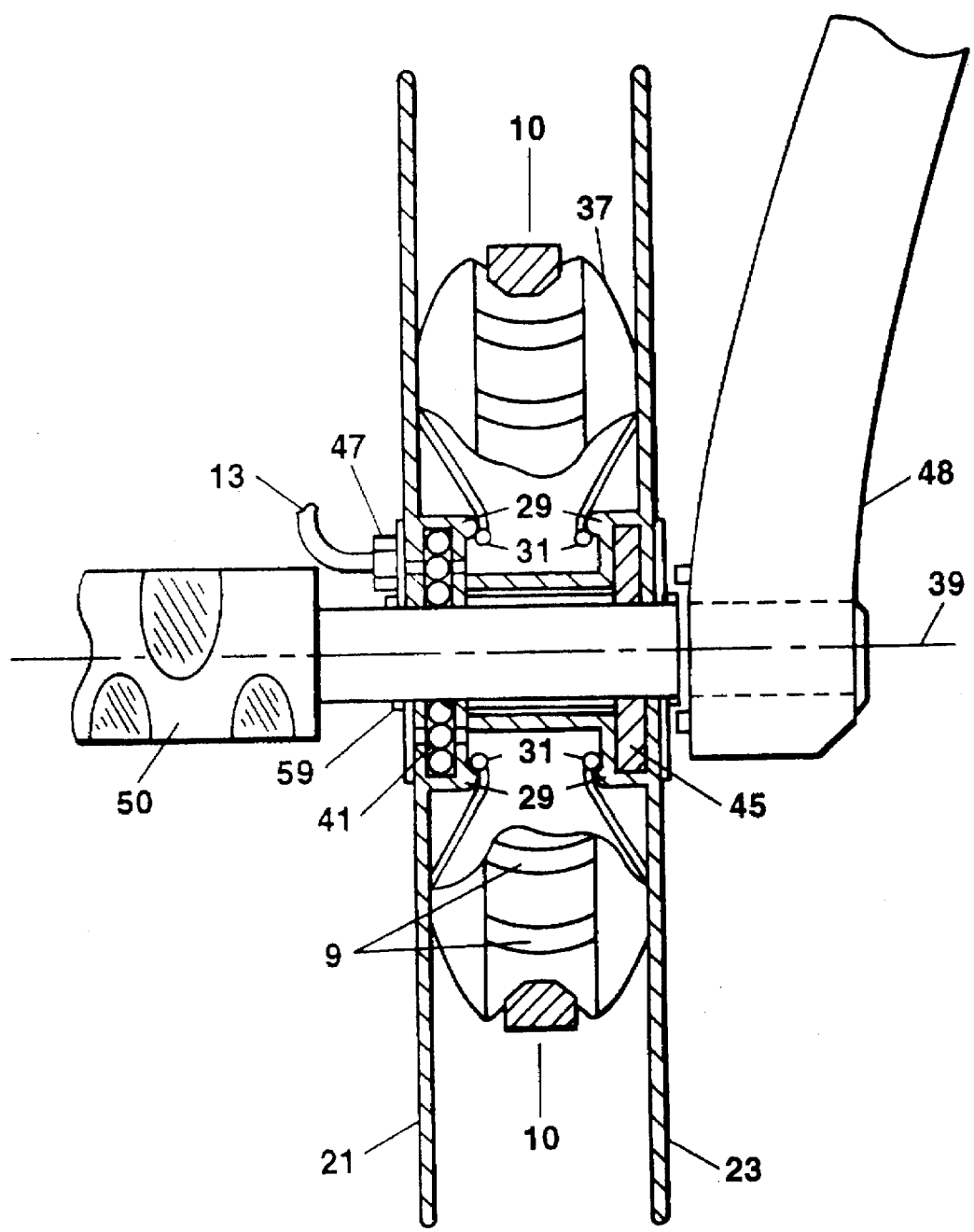
FIG. 3 is a top cut away view of the pedal axis diaphragm assembly of the transmission mounted at the pedal axis.

As depicted in FIG. 3, inner support wall 21 and outer support wall 23 are mounted on either side of the pedal axis diaphragm 37 and secured between the bicycle frame 50 and the pedal crank 48. Inner support wall 21 has a circular recess into which fits the ball bearing seat 41. Outer support wall 23 has a circular recess into which fits outer seat 45. The diaphragm 37 is somewhat toroidally-shaped, and encircles a portion of the pedal axis 39, being sealed to the inner surfaces of each of the inner support wall 21 and the outer support wall 23. As shown in FIG. 3, the circular recess of each of the support walls 21, 23 extends inward toward the space between the two support walls 21, 23. Along the edge of the recess of each of the support walls 21, 23 is a lip 29 extending inward toward the space between the two support walls. A bead 31 is located on either side of diaphragm 37, and each bead engages one of the lips 29. When the diaphragm is sufficiently pressurized, the beads 31 are held in place against their respective lips 29, sealing the inner fluid chamber of the diaphragm 37.

To change the size of the diaphragm, pressure changes are relayed to the pedal axis diaphragm 37 via the pressure tube 13. Pressure tube 13 is secured to the rotationally independent pressure cuff 59 via the pressure tube hex nut 47. As with the drive wheel diaphragm 36, the drive belt 10 rides along the outer circumference of the pedal axis diaphragm 37 where friction is maintained via raised teeth 9 which grip teeth of the drive belt 10.

Figure 4A:
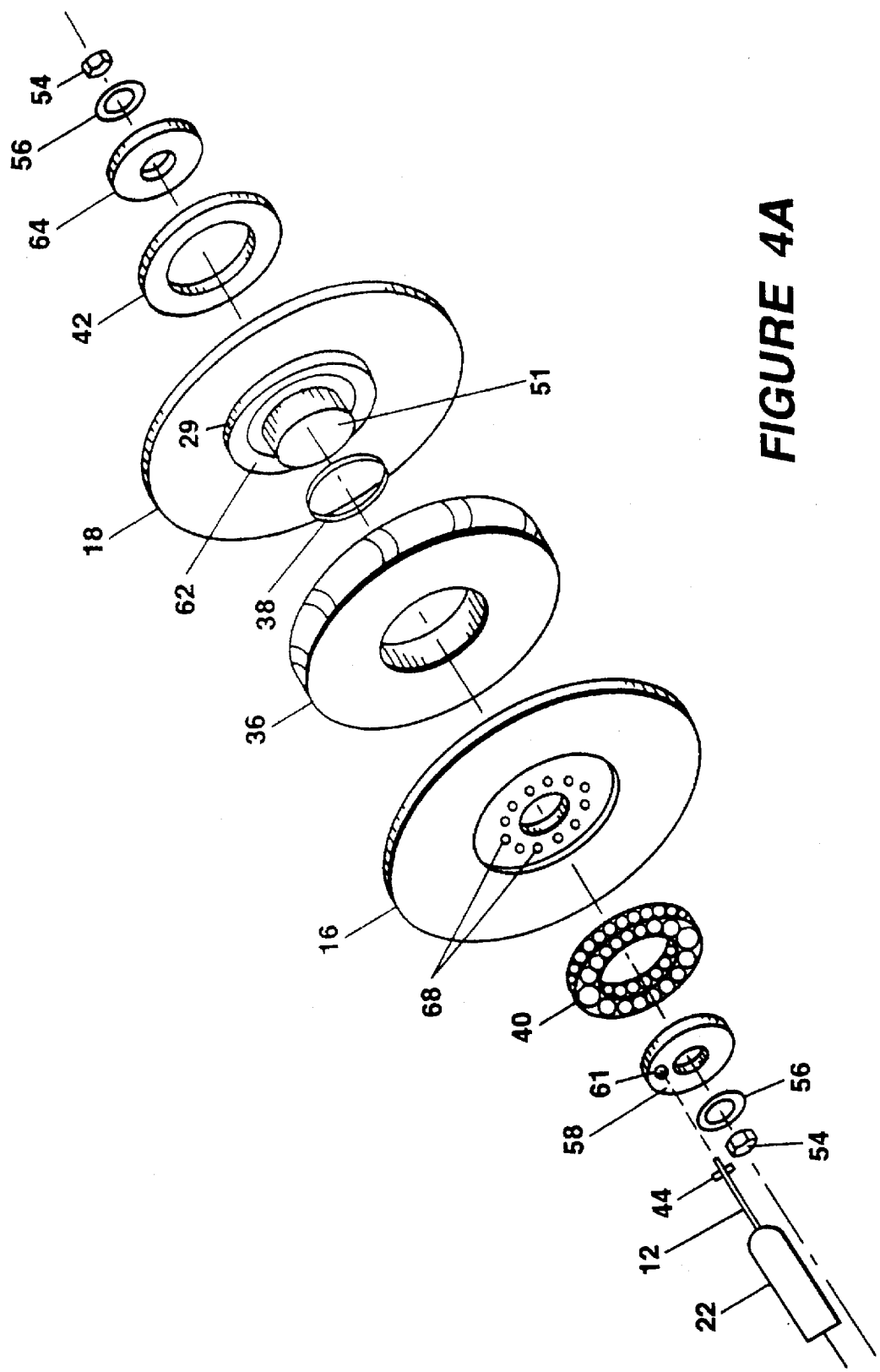
FIG. 4A is an exploded view of a diaphragm used with a drive wheel hub diaphragm assembly.

FIG. 4A depicts an exploded view of the components of the drive wheel diaphragm 36 assembly. The drive wheel assembly and the pedal axis assembly are essentially the same, except for their location and orientation. The drive wheel assembly has its pressure inlet (i.e. pressure tube 12) facing away from the frame of the bicycle, while the pedal axis diaphragm assembly has its pressure inlet (i.e. pressure tube 13) facing toward the frame of the bicycle. In effect, the pedal axis diaphragm assembly is identical to the drive wheel diaphragm assembly, except that it is orientated at 180° relative to the drive wheel diaphragm assembly (the rotation being taken about a line perpendicular to its rotational axis).

Referring again to FIG. 4A, pressure tube 12 is fastened to the pressure cuff 58 via the pressure tube hex nut 44. The cuff 58 fits inside large ball bearing seat 40 which seats within the recessed side of outer support wall 16. In operation, the outer support wall inlet holes 68 will repeatedly line up with the pressure port 61 of the pressure cuff 58. The support wall O-ring 38 is located between the outer support wall 16 and the inner extending portion 51 of the inner support wall 18. This O-ring 38 enhances the seal of the diaphragm to prevent pressurized fluids from escaping from the diaphragm. When the diaphragm assembly is assembled, the drive wheel diaphragm 36 is seated on the lip 29 of diaphragm seat 62, which is integral with inner wall 18, and lip 29 of an opposing diaphragm seat of outer wall 16 (not shown). The inner seat 42 is seated in the recessed portion of inner support wall 18 and also receives the inner cuff 64. At opposite ends of the assembly, lock washers 56 and hex nuts 54 are used to fasten the assembly to the drive wheel axle, which rotates with the diaphragm assembly, and includes a conventional coast mechanism which allows it to continue rotating with the rear wheel after rotation of the diaphragm assembly is discontinued.

Figure 4B:
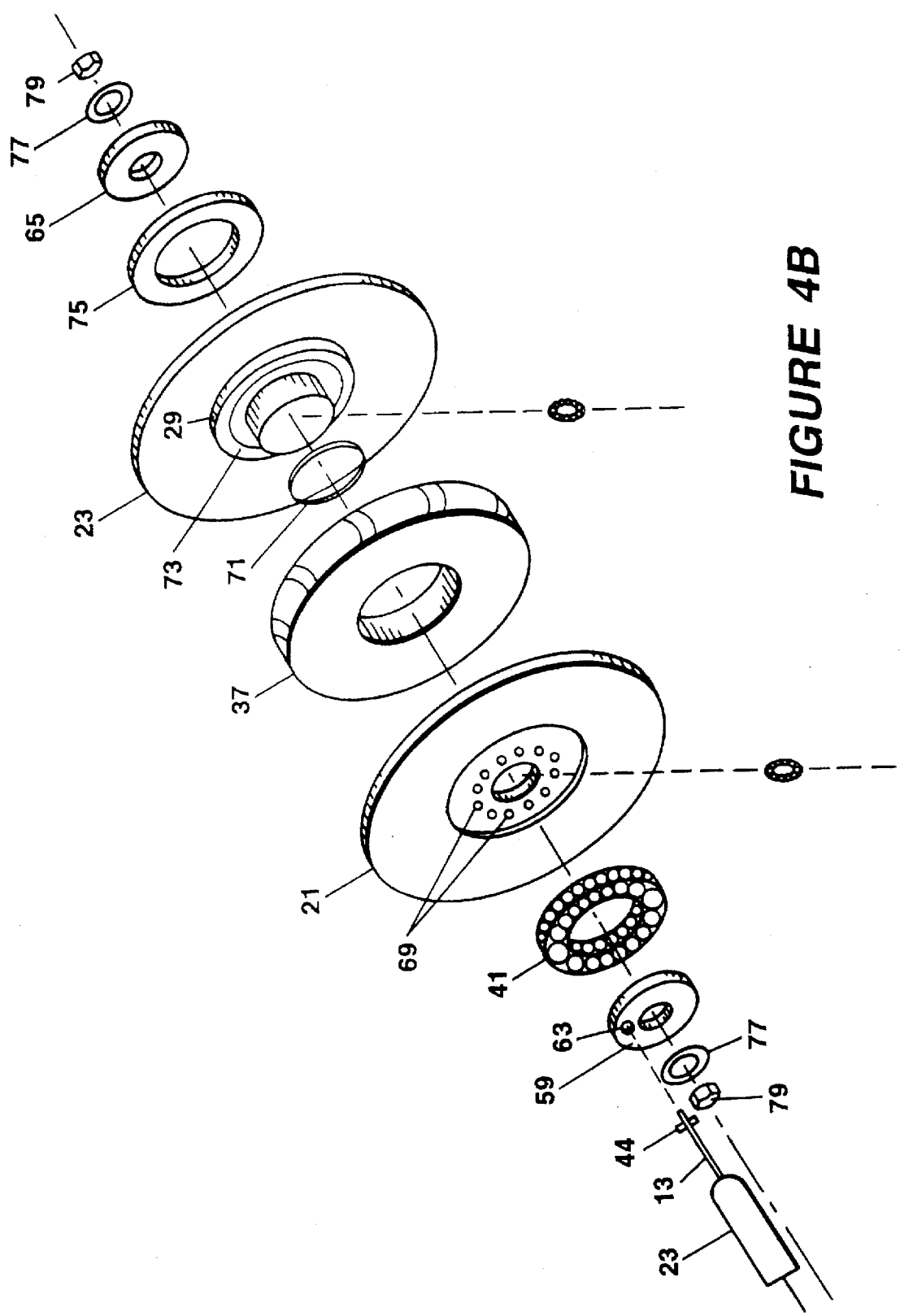
FIG. 4B is an exploded view of a diaphragm used with a pedal axis diaphragm assembly

FIG. 4B is similar to FIG. 4A, but depicts the elements of the pedal axis diaphragm assembly. The arrangement of the components is essentially the same as that of the drive wheel diaphragm assembly but, as mentioned above, the arrangement of the inner and outer walls 21, 23 (along with the pressure cuff 59 and pressure tube 13) is opposite that of the drive wheel diaphragm assembly. That is, the pressure cuff 59 and pressure tube 13 are to the side of the diaphragm which faces toward the bicycle frame, not away from it. As such, the fluid connection to the diaphragm is through an inner wall 21.

As with the drive wheel diaphragm assembly, the pressure cuff 59 remains stationary as the diaphragm rotates. In this case, the pressure cuff 59 is rigidly connected to the pedal axle. Since the pedal axle does not rotate, small ball bearing seats 60 are provided which fit, respectively, within the inner support wall 21 and the outer support wall 23. These small ball bearing seats encompass the pedal axle, and provide a low-friction rotational connection between the diaphragm assembly and the pedal axle.

The pressure cuff 59 fits inside large ball bearing seat 41 which seats against the recessed side of inner support wall 21. In operation, the outer support wall inlet holes 69 will repeatedly line up with the pressure port 63 of the pressure cuff 59. The support wall O-ring 71 is applied between the inner support wall 21 and the inwardly extending portion 53 of the outer support wall 23. The pedal axis diaphragm 37 is seated against the lip 29 of diaphragm seat 73 of outer support wall 23, and a corresponding lip 29 (not shown) of inner support wall 21. The outer seat 75 is seated in the recessed portion of the outer support wall 23 and receives outer cuff 65. At opposite ends of the assembly, lock washers 77 and hex nuts 79 are used to fasten the assembly to the pedal axle.

FIG. 5A is a side view of a pressure cylinder 22 of the present invention, and FIG. 5B is an exploded view of the cylinder 22. Both cylinders 22 in the preferred embodiment are identical except that one connects to cable 30 and pressure tube 12, while the other connects to cable 32 and pressure tube 13. While the following description refers only to the cylinder servicing the drive wheel diaphragm assembly 17, it will be understood that this description is equally descriptive of the cylinder servicing the pedal axis diaphragm assembly 19.

The pressure cylinder 22 receives the pressure cylinder piston head 74 with embedded pressure cylinder piston O-rings 76 mounted on an outer surface of the piston 74. Pressure cylinder spring 72 is fitted over the pressure cylinder piston rod 78 and held in place within the pressure cylinder 22 by the threaded pressure cylinder cap 80, which seats against the pressure cylinder cap O-ring 82 within the pressure cylinder 22, and meshes its threads with threads on an inner surface of the cylinder. The pressure cylinder piston rod 78 extends out of the hole in the pressure cylinder cap 80 and is fastened to shifter cable 30, 32. The pressure tube is connected to the threaded pressure tube hex nut seat 84 via the pressure tube hex nut 44.

The shifting of drive ratios is accomplished either via left or right shifter cables 30, 32. The amount of cable drawn or released by either the left or right shifter is tuned at that particular shifter (left and right shifters here refer to commonly found multi-speed shifter mechanisms). Drawing of the left shifter cable 30 pulls the attached pressure cylinder piston rod 78 and piston head 74 through the pressure cylinder 22 towards the pressure cylinder cap 80, which is tightly threaded into the pressure cylinder 22. Piston O-rings 76 ensure that a pressurized fluid (such as air) within the pressure cylinder 22 does not bypass the pressure cylinder piston 74. The drawing back of the piston through the cylinder creates a relative low-pressure zone within the pressure cylinder 22. This causes a withdrawal of pressurized fluid from the pedal axis diaphragm 37 (FIG. 3) through pressure tube 12, and an overall reduction of pressure within the diaphragm 37.

The reduction of pressure within the diaphragm 37 results in a deflation of the diaphragm and a corresponding decrease in its diametric size. This change in diameter changes the mechanical advantage between the pedal axis diaphragm 37 and the drive wheel diaphragm 36. Specifically, as the pedal axis diaphragm 37 is deflated, the mechanical advantage between the pedal rotation and the rotation of the rear wheel (as driven by the drive belt) is increased, and the bicycle becomes easier to pedal. A release action of the left shifter cable 30, however, has the opposite effect.

Releasing tension on the left shifter cable 30 allows the tensioned pressure cylinder spring 72 to force the pressure cylinder piston head 74 through the pressure cylinder 22. This creates a high pressure zone within the pressure cylinder 22, and causes an inflation of diaphragm 37 via pressure tube 13. The inflation of the diaphragm 37 results in a decrease in the mechanical advantage to the rider, making the bicycle more difficult to pedal. However, as with conventional transmissions, the number of revolutions of the rear wheel per pedal rotation is increased.

The pressure cylinder 22 connected to the drive wheel diaphragm 36 operates in the same manner as that connected to the pedal axis diaphragm 37, and is therefore also represented by FIG. 5. The functionality of the two cylinders is identical, except that each provides pressurization and depressurization of a different one of the drive wheel and pedal axis diaphragms. Thus, as the right shifter cable 32 is pulled, the drive wheel diaphragm is depressurized. This changes the mechanical advantage to the bicycle rider in a manner opposite to that of the left shifter cable. That is, as the drive wheel diaphragm 36 is deflated, the mechanical advantage to the rider decreases, and the bicycle becomes more difficult to pedal. However, as described above, the increased gear ratio allows for faster speeds with the same pedal rotation. Correspondingly, a release action of the right shifter moves the right shifter cable is in an opposite direction, and the spring 72 of the cylinder forces the piston to compress the fluid of the diaphragm 36, increasing the diameter of the diaphragm, and the mechanical advantage to the rider.

The alteration in drive ratios for the preferred embodiment of the present invention is taken from that of common multi-speed bicycles. Specifically, shifting the left shifter cable 30 alone preferably provides a range of 25-40% alteration in drive ratio. Shifting the right shifter cable 32 alone provides a 7-14% alteration in drive ratio.

As ratio alterations are made, both the pedal axis diaphragm 35 (FIG. 3) and the drive wheel diaphragm 36 (FIG. 2) diametric sizes are changed which causes either slack or tensioning of the drive belt 10. In the preferred embodiment, the belt is a nylon drive belt. The belt also preferably has teeth which mesh with teeth on the diaphragms. However, other belt materials, including belts with or without teeth, may be used. Since a snug-fitting drive belt 10 is essential for optimal drive this slack or tensioning is compensated by the belt tensioning mechanism 91 shown in more detail in FIG. 6. The belt tensioning mechanism 91 includes upper tensioner arm 88, lower tensioner arm 90, drive belt pulley 92, drive belt pulley 92, and the drive belt tensioner spring 96.

Upper tensioner arm 88 is affixed to the bicycle frame 50 via the hex nut 100 and lock washer 102. Drive belt pulley 92 rotates on the bolt 98 and lock washer 102 combination attached to the upper tensioner arm 88. The drive belt pulley 93 rotates on the bolt 98 and lock washer 102 combination attached to the lower tensioner arm 90. When one of the diaphragms is deflated, for example, slack in the drive belt 10 is tightened as a result of the drive belt tension spring 96 (attached to both drive belt tension arms) imparting a tension between upper tensioner arm 88 and lower tensioner arm 90.

The lower tensioner arm 90 pivots freely on bolt 98, by which it is affixed to the upper tensioner arm 88. The lower tensioner arm 90 is biased toward the upper tensioner arm 88 by the drive belt tensioner spring 96, which is normally under extension. The tension of spring 96 is countered by the tension of the drive belt 10, which tends to bias the lower tensioner arm in an angular direction away from the upper tensioner arm 90. Spring 96 is affixed to upper tensioner arm 88 by a hex nut 100, and affixed to lower tensioner arm 90 via hex nut 101. This arrangement of arms and pulleys, along with the normally-extended spring 96, keeps the drive belt 10 at a desired tension.

One notable advantage of the present invention is the ability to customize the range of gear ratios of the transmission to a particular rider. The minimum and maximum gear ratios provided by the transmission depend on an initial pressure of the diaphragms. That is, the diaphragms may be pressurized initially such that, when both shifters are at their lowest positions, a desired gear ratio exists between the two diaphragms. Moving the shifters then changes the gear ratio relative to the initial, desired gear ratio. Therefore, the initial pressure may be set to accommodate a rider who desires a higher initial gear ratio, or one who desires a lower initial gear ratio.

While the invention has been shown and described with regard to a preferred embodiment thereof, it will be apparent to those skilled in the art that various changes may be made in the form and detail thereof without departing from the spirit and scope of the invention as defined by the appended claims.

What is claimed is:

1. A variable-speed transmission for converting rotational energy about a first axis to rotational energy about a second axis, the transmission comprising:

a first rotational element which rotates about the first axis in response to the application of an external rotational energy source;

a second rotational element which rotates about the second axis, the second rotational element comprising an inflatable diaphragm having a diameter which increases with increasing fluid pressure within the diaphragm;

a drive belt linking rotational motion of the first rotational element to rotational motion of the diaphragm and the second rotational element; and a variable pressure source in fluid communication with the inflatable diaphragm, the pressure source being controllable to change said fluid pressure within the diaphragm.

2. A transmission according to claim 1 wherein the inflatable diaphragm is a first inflatable diaphragm and the first rotational element comprises a second inflatable diaphragm having a diameter which increases with increasing fluid pressure within the second diaphragm, and wherein the variable pressure source is a first variable pressure source and the transmission comprises a second variable pressure source in fluid communication with the second diaphragm, the second pressure source being controllable to change said fluid pressure within the second diaphragm.

3. A transmission according to claim 1 wherein the variable pressure source comprises a pressure cylinder having a piston which, when moved, changes the fluid pressure within a region of the cylinder which is in fluid communication with the diaphragm.

4. A transmission according to claim 1 wherein the second rotational element further comprises an inner wall to which a first side of the diaphragm is sealed and a outer wall to which a second side of the diaphragm is sealed, the inner and outer walls rotating with rotation of the diaphragm.

5. A transmission according to claim 4 wherein the drive belt contacts an outer surface of the diaphragm, and the location of contact between the drive belt and the outer surface of the diaphragm is between the inner wall and outer wall such that the inner wall and outer wall prevent the belt from slipping out of contact with the diaphragm.

6. A transmission according to claim 1 further comprising a fluid connection between the pressure source and the diaphragm which provides said fluid communication therebetween, the fluid connection comprising a pressure port through which fluid from the pressure source passes, and an aperture plate which rotates with the diaphragm, the plate having a rotational motion relative to the pressure port and a plurality of fluid apertures disposed about, and at an equal distance from, a rotational axis of the aperture plate, the locations of the apertures being such that each of the apertures is aligned with and in fluid communication with the pressure port at a different angular position of the plate.

7. A transmission according to claim 1 wherein the transmission is a bicycle transmission, and the first axis is a pedal axis and the second axis is a drive wheel axis.

8. A transmission according to claim 1 further comprising a tensioning mechanism through which the drive belt is threaded and which controls a level of tension of the drive belt.

9. A transmission according to claim 8 wherein the tensioning mechanism comprises a first pulley in contact with the drive belt and a second pulley in contact with the drive belt such that tension of the drive belt biases a relative separation between the pulleys in a first direction, the tensioning mechanism further comprising a spring which biases said relative separation between the pulleys in a direction away from the first direction.

* * * * *